(12) United States Patent
Fontanel et al.

(10) Patent No.: US 11,635,001 B2
(45) Date of Patent: Apr. 25, 2023

(54) EMERGENCY VENTILATION DEVICE FOR A TURBINE OF A TURBINE ENGINE, TRIGGERED BY THE MELTING OF A LOCKING MEANS

(71) Applicant: SAFRAN AIRCRAFT ENGINES, Paris (FR)

(72) Inventors: Eddy Stéphane Joël Fontanel, Moissy-Cramayel (FR); Matthieu Etienne Attali, Moissy-Cramayel (FR); Gérard Phillippe Gauthier, Moissy-Cramayel (FR); Wilfried Lionel Schweblen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 36 days.

(21) Appl. No.: 17/595,128

(22) PCT Filed: Apr. 3, 2020

(86) PCT No.: PCT/EP2020/059633
§ 371 (c)(1),
(2) Date: Nov. 9, 2021

(87) PCT Pub. No.: WO2020/229056
PCT Pub. Date: Nov. 19, 2020

(65) Prior Publication Data
US 2022/0065130 A1 Mar. 3, 2022

(30) Foreign Application Priority Data
May 10, 2019 (FR) ...................................... 1904870

(51) Int. Cl.
*F01D 25/12* (2006.01)

(52) U.S. Cl.
CPC ........ *F01D 25/12* (2013.01); *F05D 2220/323* (2013.01); *F05D 2260/20* (2013.01)

(58) Field of Classification Search
CPC .......... F01D 25/12; F01D 21/12; F01D 5/082; F01D 17/141; F01D 11/001;
(Continued)

(56) References Cited

U.S. PATENT DOCUMENTS 3,108,434 A 10/1963 Morley et al.
4,304,093 A * 12/1981 Schulze .................. F01D 25/12
60/39.091

(Continued)

FOREIGN PATENT DOCUMENTS

DE 102010020800 A1 11/2011
WO 2019077251 A1 4/2019

OTHER PUBLICATIONS

French Search Report issued in FR1904870 dated Jan. 20, 2020 (10 pages).
(Continued)

*Primary Examiner* — Igor Kershteyn
(74) *Attorney, Agent, or Firm* — Bookoff McAndrews, PLLC

(57) ABSTRACT

An aircraft turbomachine module comprising a ventilation device configured to have a cooling air flow circulate in the turbomachine module, the ventilation device comprising an air outlet, blocking means fixed to the air outlet and mobile between a blocking position of the air outlet and an opening position of the air outlet, and locking means configured to maintain the blocking means in one of the blocking position and the opening position when the temperature within the module is less than a predetermined threshold value, the blocking means being configured to adopt the other of the blocking position and the opening position when the tem-
(Continued)

perature within the module is greater than said predetermined threshold value.

4 Claims, 2 Drawing Sheets

(58) Field of Classification Search
CPC ........... F05D 2220/323; F05D 2260/20; F05D 2270/42; Y02T 50/60
See application file for complete search history.

(56) References Cited

U.S. PATENT DOCUMENTS

| | | | |
|---|---|---|---|
| 4,807,433 A | 2/1989 | Maclin et al. | |
| 4,967,552 A * | 11/1990 | Kumata | F01D 11/24 |
| | | | 415/115 |
| 5,320,483 A * | 6/1994 | Cunha | F01D 5/187 |
| | | | 415/114 |
| 5,340,274 A * | 8/1994 | Cunha | F02C 7/16 |
| | | | 415/48 |
| 5,402,638 A * | 4/1995 | Johnson | F02K 3/075 |
| | | | 60/226.3 |
| 5,932,940 A * | 8/1999 | Epstein | F01D 25/20 |
| | | | 60/39.35 |
| 7,077,622 B2 | 7/2006 | Ehrhard et al. | |
| 10,273,812 B2 * | 4/2019 | Huppe | F02C 7/18 |
| 10,337,411 B2 * | 7/2019 | Miranda | F02C 7/18 |
| 10,684,149 B2 * | 6/2020 | Koenig | F01D 9/065 |
| 2018/0284758 A1 * | 10/2018 | Celia | G05B 23/0289 |

OTHER PUBLICATIONS

International Search Report dated Jun. 4, 2020 in International Application PCT/EP2020/059633 with English Translation (5 pages).
Written Opinion of the International Searching Authority in International Application PCT/EP2020/059633 (6 pages).

* cited by examiner

[Fig. 1]
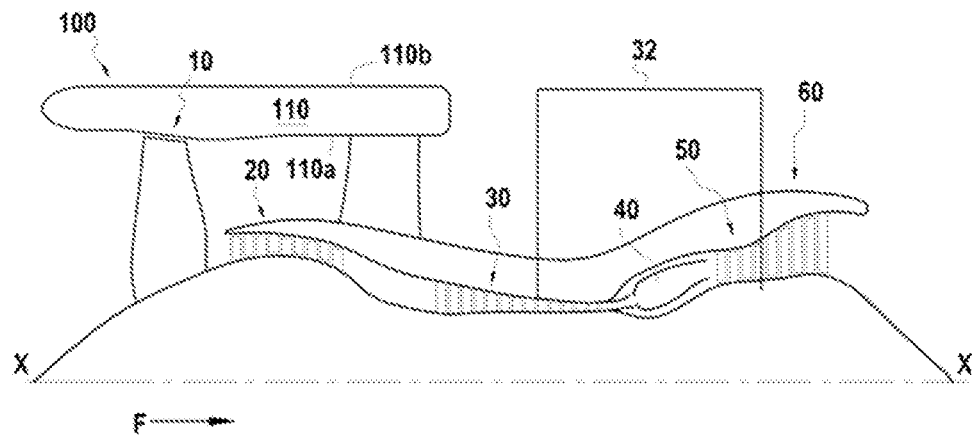
[Fig. 2]
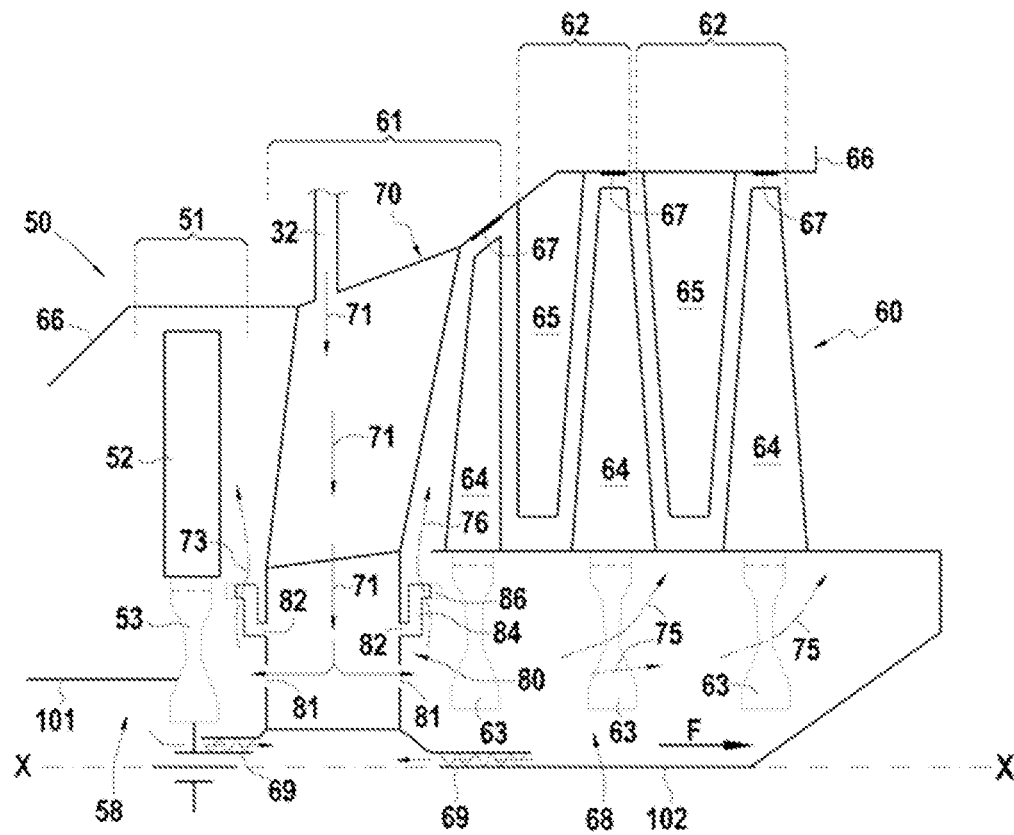

[Fig. 3]
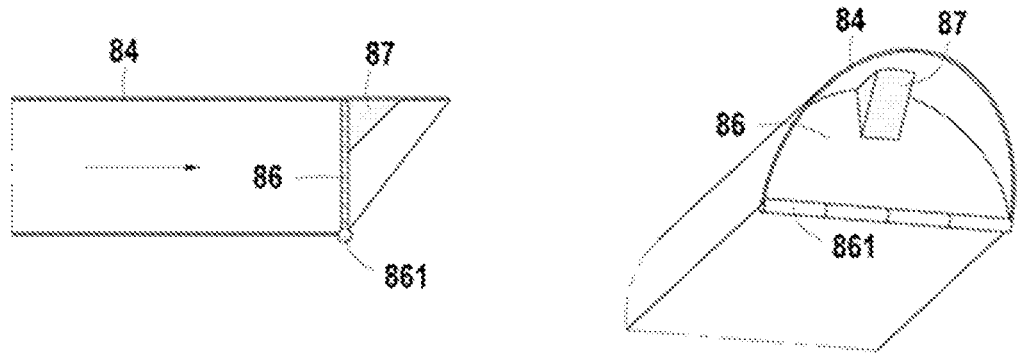
[Fig. 4]
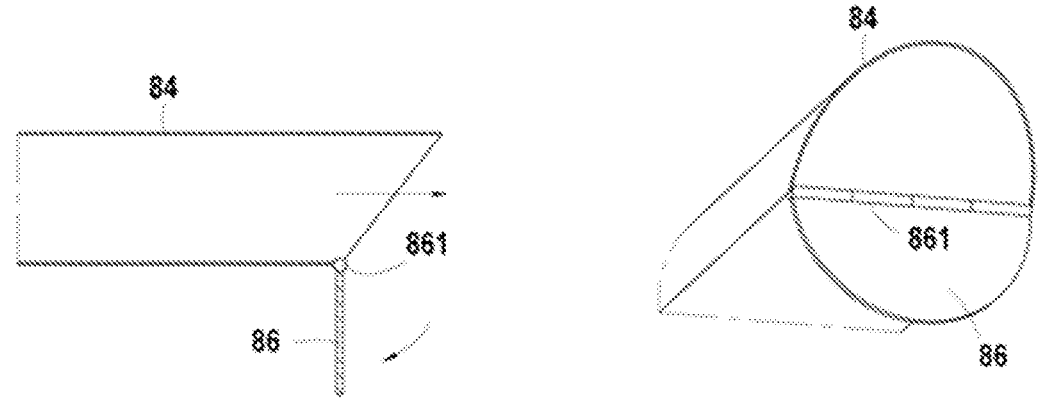
[Fig. 5]
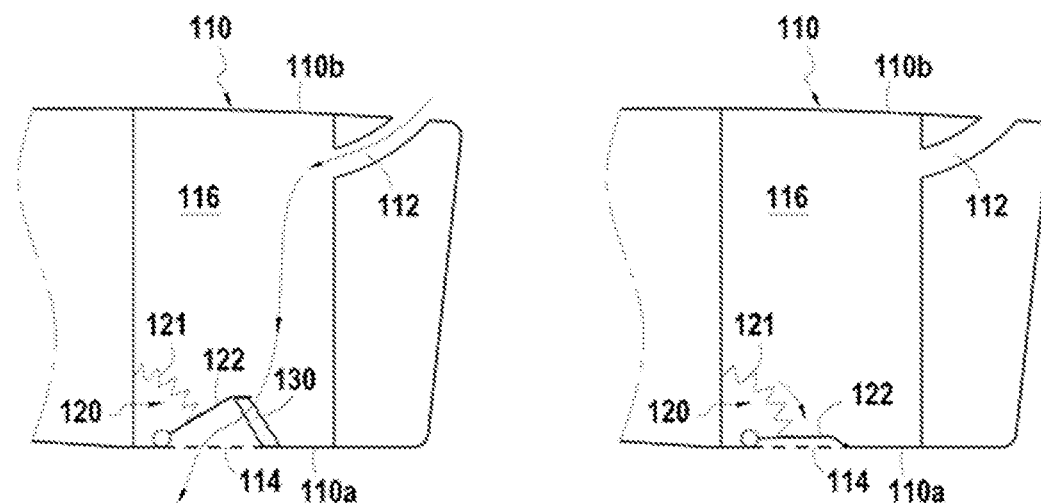

EMERGENCY VENTILATION DEVICE FOR A TURBINE OF A TURBINE ENGINE, TRIGGERED BY THE MELTING OF A LOCKING MEANS

CROSS-REFERENCE TO RELATED APPLICATIONS

This patent application is the U.S. National Stage entry under 35 U.S.C. § 371 of International Patent Application No. PCT/EP2020/059633, filed on Apr. 3, 2020, which claims the benefit of priority to French Patent Application No. 1904870, filed on May 10, 2019.

TECHNICAL FIELD

The invention relates to the field of turbomachines. More precisely, the invention relates to an aircraft turbomachine module, and a turbomachine comprising such a module.

PRIOR ART

In aircraft turbomachines, it is common to use secondary air circuits, for example ensuring ventilation rates necessary in some areas of these turbomachines. Some of these secondary air circuits can be necessary in the event of malfunction only, and are not useful in the event of nominal operation of the turbomachine. For reasons of operation optimisation in turbomachines, and power economy, it is therefore often preferable for these secondary circuits to operate solely in case of malfunctions. For instance, in case of malfunction of the purge rate in a low-pressure turbine or a high-pressure turbine, allowing purging of hot air and ventilation of some parts (e.g. discs, mobile vanes) of these turbines, an additional flow of cooling air is necessary to limit the risk of overheating of mobile parts of the turbines, which can result in degradation of the latter and in the worst case scenario breakage of these parts.

Inversely, in other cases of malfunction, it can be preferable on the contrary to stop supplying these secondary air circuits. For example, in the event of fire in a closed environment, such as a compartment inside a turbomachine nacelle for example, it is necessary to cut off ventilation air circulation so as not to feed the fire.

For controlling these secondary air circuits as a function of temperature conditions, it is known to use systems comprising parts such as fusible plugs which can melt above a particular temperature.

However, in an engine environment these existing solutions can exhibit disadvantages, especially in locations close to high-power revolving parts. In fact, these fusible parts can release substantial quantities of material which can make contact with the revolving parts and create harmful mechanical damage. Therefore there is a need to mitigate these disadvantages.

DISCLOSURE OF THE INVENTION

The present disclosure relates to an aircraft turbomachine module comprising a ventilation device configured to have a cooling air flow circulate in the turbomachine module, the ventilation device comprising an air outlet, blocking means fixed to the air outlet and mobile between a blocking position of the air outlet and an opening position of the air outlet, and locking means configured to maintain the blocking means in one of the blocking position and the opening position when the temperature within the module is less than a predetermined threshold value, the blocking means being configured to adopt the other of the blocking position and the opening position when the temperature within the module is greater than said predetermined threshold value.

When the cooling air is flowing in an upstream-to-downstream direction of the circulation device, the blocking position is a position in which air cannot flow between the upstream and the downstream of the air outlet. In other word, a region upstream of the air outlet is not in fluid communication with a region downstream of the air outlet. Inversely, the opening position is a position in which air can flow between the upstream and the downstream of the air outlet. In other word, a region upstream of the air outlet is in fluid communication with a region downstream of the air outlet.

When the temperature within the module is less than the predetermined threshold value, the locking means keep the blocking means in one of these two positions. Inversely, when the temperature within the module is greater than said predetermined threshold value, the locking means are configured to unlock the blocking means, letting the latter adopt the other of these two positions. Because the blocking means are fixed to the air outlet in a mobile manner between the blocking and opening position, this can therefore alternatively prevent or allow the passage of air via the air outlet, and remain solid with and fixed to said air outlet. In this way, whenever the blocking position switches to the opening position or inversely, the risk of some or a substantial quantity of material making contact with rotating parts of the turbomachine is thus limited.

In some embodiments, the locking means comprise a fusible material configured to melt when the temperature within the module reaches the predetermined threshold value.

In other words, the rise in temperature within the turbine module causes melting or creep of a part at least of the locking means. Because of this, melting or creep of the locking means allows unlocking, that is, release of the blocking means. Melting of the locking means due to the rise in temperature therefore allows the latter to move automatically from a first state, in which it keeps the blocking means in the blocking position or in the opening position, to a second state, allowing release of the blocking means, the latter then able to move to the other of the blocking or opening position.

In some embodiments, the blocking means stay solid when the temperature within the module is greater than the predetermined threshold value.

In other words, the melting temperature of the blocking means is greater than the predetermined threshold value of the temperature, so that the blocking means do not change state when said threshold value is exceeded, contrary to the locking means. In this way, the blocking means stay solid with the air outlet. The risk of a part making contact with rotating parts of the turbomachine is therefore limited.

In some embodiments, when the temperature within the module is less than the predetermined threshold value, the locking means present a volume of between 5 and 20 mm³.

When the temperature within the module is greater than the predetermined threshold value, these values ensure that the risk of a substantial quantity of material making contact with rotating parts of the turbomachine is limited. In particular, these volumes can be around thirty times less than the volumes of known fusible plugs.

In some embodiments, the module is a turbine comprising a hot airflow annular vein, a sub-vein cavity coaxial to the hot air flow vein, the ventilation device comprising an injection device configured to inject cooling air into the sub-vein cavity, and at least one tube extending into the sub-vein cavity, a first end of the tube being fixed to a wall of the sub-vein cavity, the air outlet being a second end of the tube onto which the blocking means are fixed and held in blocking position by the locking means when the temperature within the sub-vein cavity is less than the predetermined threshold value, the blocking means being configured to adopt the opening position when the temperature within the sub-vein cavity is greater than the predetermined threshold value.

The hot air flowing in the annular vein is the air coming from combustion in the turbomachine engine and driving the vanes of the turbine. The sub-vein cavity is an enclosure arranged radially for example inside the annular vein. The injection device can comprise first injectors for continuously injecting of the cooling air collected upstream into this cavity, in the high-pressure compressor for example. 'Continuously injecting' means that the first injector injects a first cooling air flow at a constant rate when the engine is operating. This first flow can be constant or oscillate about a nominal cooling air flow corresponding to nominal operation of the turbomachine, that is, operation characterised by an absence of anomaly or breakdown in the turbine. It is evident that this nominal operation can comprise wear on the turbomachine, but not the case of breakdowns such as breakage of an air supply duct. Also, in the event of breakdown causing a rise in temperature, the structural characteristics of the first injector do not change, so the first injector continues to inject the first flow. This first flow is therefore a cooling air flow necessary to ensure sufficient purging of hot air during such nominal operation of the turbomachine, without it being necessary to oversize the injection device. In the same way, during nominal operation of the turbomachine, the tube, which is a second injector separate from the first injector, can inject a second cooling air flow into the sub-vein cavity. This second flow can be zero in nominal operation.

Sufficient purge rate of hot air from the turbine is characterised by a temperature within this cavity remaining below a threshold value. Exceeding of this threshold value of the temperature indicates insufficient cooling air flow caused by an anomaly occurring in the cooling circuit of the turbomachine. In this configuration where the threshold value of the temperature is being exceeded, the locking means change state, releasing the blocking means fixed to the second end of the tube. By way of the tube, the second injector can then inject additional cooling air flow, greater than the first flow, into the sub-vein cavity. The total flow of cooling air, comprising the air injected by the first injector and the air injected by the second injector, is therefore greater than the nominal cooling air flow injected by the injection device during nominal operation of the turbomachine.

Consequently, controlling of the cooling air flow injected into the sub-vein cavity as a function of the temperature within the latter increases the cooling air flow only in the event of malfunction or breakdown, characterised by a rise in temperature within the sub-vein cavity. This consequently boosts the cooling air flow only when necessary, without the need for permanent oversizing of the cooling device. The impact of the cooling system on fuel consumption is accordingly limited, improving engine performance. Also, the fact that the blocking means remain attached to the tube when the threshold temperature is exceeded limits the risk that some material, or a substantial quantity of material, makes contact with rotating parts, the vanes of the turbine for example.

In some embodiments, the temperature threshold value is between 550 and 600° C.

This threshold temperature is preferably less than a critical temperature from which the elements of the turbine such as the vanes break down. In this way, when the temperature threshold value within the cavity is reached, the injection of additional cooling air flow, by way of the ventilation device, decrease the temperature of the turbine before the vanes, or the disc bearing the vanes, break down.

In some embodiments, the blocking means are a flap mobile between the blocking position and opening position by means of a hinge fixed to the second end of the tube.

When the temperature within the sub-vein cavity is less than the predetermined threshold value, the cooling air in the tube exerts pressure on a face of the flap, the latter being held by the locking means. When the temperature within the sub-vein cavity rises above the predetermined threshold value, the locking means release the flap, the latter then capable of pivoting around the axis of rotation formed by the hinge. This hinge mechanism has the advantage of being simple to execute and keeps the flap attached to the tube, even when it is in opening position.

In some embodiments, the locking means are a deposit of eutectic material in an angle between the flap in blocking position and the wall of the tube.

The deposit of eutectic material is in solid state when the temperature within the sub-vein cavity is less than the predetermined threshold value. 'In an angle between the flap in blocking position and the wall of the tube' means that the deposit is fixed both to the wall of the tube and to the flap. The deposit therefore acts as a wedge preventing the flap from opening during nominal operation of the turbomachine. A small quantity of eutectic material is therefore necessary to ensure this wedging function. In this way, when this material is changing state when the threshold temperature is reached the quantity of material at risk of making contact with rotating parts is limited.

In some embodiments, the module is a low-pressure turbomachine turbine having non-ventilated bladings.

In some embodiments, the module is a turbomachine nacelle defining an internal compartment, the ventilation device comprising air admission means in the internal compartment, the air outlet comprising an air outlet grille configured to evacuate air from the internal compartment, the blocking means being fixed to the air outlet and held in opening position of the air outlet grille by the locking means when the temperature within the internal compartment of the nacelle is less than the predetermined threshold value, the blocking means being configured to adopt the blocking position of the air outlet grille when the temperature within the internal compartment is greater than the predetermined threshold value.

The turbomachine nacelle can define an annular flow vein of a secondary flow in the turbomachine. The nacelle encloses an internal compartment, in which electronic equipment can be housed. The ventilation device cools this equipment during nominal operation of the turbomachine. In this case, the locking means hold the blocking means in opening position of the air outlet grille to ensure circulation of the cooling air in the internal compartment.

During a malfunction, for example in the event of fire in the internal compartment, the temperature in this compartment rises. When the threshold temperature is reached, the locking means change state, therefore releasing the blocking means, the latter capable of adopting the blocking position of the air outlet grille. This effectively prevents cooling air from circulating in the internal compartment, consequently stifling the fire.

In some embodiments, the temperature threshold value is between 480 and 530° C.

This threshold temperature prevents circulation of air sufficiently soon after the fire is triggered, such that this reduces the intensity and propagation of the fire, and therefore mitigates extinguishing media and the parts which have to be fireproof.

In some embodiments, the blocking means comprise a lid and a spring configured to exert pressure on the lid tending to move the lid into the blocking position of the air outlet grille.

When the temperature within the internal compartment is less than the predetermined threshold value, the cooling air can be evacuated via the air outlet grille, the lid being held in opening position by the locking means which counter the force exerted by the spring. When the temperature within the internal compartment goes above the predetermined threshold value, the locking means release the lid, the latter then being pushed by the spring as far into the blocking position of the air outlet grille. This spring mechanism has the advantage of being simple to execute and keeps the lid solid with the wall of the nacelle preventing the lid from moving into the turbomachine and making contact with revolving parts.

In some embodiments, the locking means are a wedge comprising a eutectic material and being inserted in between a wall of the nacelle adjacent to the outlet grille and the lid when the temperature within the internal compartment of the nacelle is less than the predetermined threshold value.

The locking means can be for example a rod, or a wand, one end of which rests on the wall of the nacelle, to the side of the air outlet grille, for example fewer than 5 cm from the latter, and the other end rests on the lid. This fine form of the locking means has the advantage of not impeding the passage of cooling air via the outlet grille in nominal operation. Also, this form limits the quantity of material needed to form the locking means.

The present disclosure also relates to a turbomachine comprising the module according to any one of the preceding embodiments.

BRIEF DESCRIPTION OF THE DRAWINGS

The invention and its advantages will be better understood from the following detailed description of different embodiments of the invention given by way of non-limiting examples, this description making reference to the pages of appended figures, in which:

FIG. 1 is a longitudinal sectional view of a turbomachine,

FIG. 2 is a longitudinal and partial sectional view of a high-pressure and low-pressure turbine of the turbomachine of FIG. 1, FIG. 3 is a sectional view (at left) and a perspective view (at right) of an air outlet of a ventilation device of the turbine of FIG. 2, with blocking means in blocking position, FIG. 4 is a sectional view (at left) and a perspective view (at right) of the air outlet of FIG. 3, with the blocking means in opening position, FIG. 5 is a sectional view of a nacelle of the turbomachine of FIG. 1, with blocking means in opening position (at left), and in blocking position (at right).

DESCRIPTION OF THE EMBODIMENTS

A first embodiment of the present disclosure will be presented in reference to FIGS. 1 to 4.

The terms 'upstream' and 'downstream' are defined hereinbelow relative to the direction of flow of gases through a turbomachine, indicated by the arrow F in FIGS. 1 and 2.

FIG. 1 illustrates a dual-flow turbomachine 100 comprising in a manner known per se from upstream to downstream successively at least one fan 10, an engine part comprising successively at least one low-pressure compressor stage 20, high-pressure compressor stage 30, combustion chamber 40, at least one high-pressure turbine stage 50 and low-pressure turbine stage 60. In the present embodiment, the turbomachine module is a high-pressure turbine stage 50 or low-pressure turbine stage 60.

Rotors, rotating around the main axis X of the turbomachine 100 and which can be joined together by different transmission and gear systems correspond to these different elements.

As is known, a fraction of air is drawn on the high-pressure compressor 30 and is forwarded by means of a cooling conduit 32 for cooling of the warmer zones of the turbomachine 100, especially the high-pressure turbine 50 and the low-pressure turbine 60.

FIG. 2 is an enlargement of a zone of the turbomachine 100, a simplified illustration of the downstream part of the high-pressure turbine 50 and the upstream part of the low-pressure turbine 60.

The downstream part of the high-pressure turbine 50 shown here illustrates a stage 51 comprising at least one mobile vane 52 assembled on a mobile disc 53 solid in rotation with a high-pressure shaft 101.

The low-pressure turbine 60 illustrated here comprises a plurality of turbine stages 61, 62. A first stage 61, as well as the stages 62 located downstream of the latter, comprise a set of fixed distributors 70 and 65 respectively. Each stage 61, 62 also comprises a mobile disc 63 on which a set of vanes 64 driven in rotation by the disc 63 mobile is mounted. The first stage 61 of the low-pressure turbine 60 comprises at least one mobile vane 64, as well as at least one hollow distributor 70 in which cooling air circulates. In the example illustrated in FIG. 2, the distributor 70 forms a single part with a housing 66 constituting the turbine and is hollow to allow cooling air through, exiting by way of an injection device 80 joined to the distributor 70, comprising a plurality of injectors. The following stages 62, located downstream of the low-pressure turbine 60, each comprise at least one mobile vane 64 and a distributor 65 in the form of fixed blading. The mobile disc 63 is solid in rotation with a low-pressure shaft 102 extending according to the axis X-X, while each stator 65 is connected to the housing 66. Each turbine stage 61, 62 also comprises a turbine ring 67 located opposite the mobile vanes 64, and which is attached to the housing 66.

According to the present disclosure, the turbomachine comprises a cooling device for conveying the fraction of air drawn on the high-pressure compressor 30 via the cooling conduit 32 to at least one stage of the high-pressure turbine 50 and of the low-pressure turbine 60. In the embodiment described hereinbelow, the fraction of cooling air drawn is distributed in the region of a downstream stage of the high-pressure turbine 50 and an upstream stage of the low-pressure turbine 60. The high-pressure and low-pressure turbines 50, 60 are cooled accordingly. However, the invention is not limited to this embodiment, with the fraction of air drawn also able to be distributed to other stages of the turbines.

In the embodiment illustrated in FIG. 2, the fraction of air drawn in the high-pressure compressor 30 flows into the cooling conduit 32, then into the hollow distributor 70. The direction of circulation of the fraction of air through the hollow distributor 70 is illustrated by the arrows 71. The fraction of air is then injected via the injection devices 80 into a sub-vein cavity 58, 68. The distributed air especially cools the discs 53, 63 of the turbines, as illustrated by the arrows 75. The cooling air injected by the injection devices 80 also allows purging of hot air present in the high-pressure turbine 50 and in the low-pressure turbine 60, ensuring cooling of the latter. More precisely, the cooling air collected in the high-pressure compressor and conveyed as far as the sub-vein cavities 58, 68 constitutes a pressure barrier or purge, preventing hot air coming from the combustion chamber and flowing into the main air circulation vein of the turbines, that is, into the primary air circulation vein of the turbomachine 100, to enter the sub-vein cavities 58, 68. Purging of the hot air of the high-pressure turbine 50 and of the low-pressure turbine 60 is symbolised here by arrows 73, 76 respectively. The risks of overheating of the rotors of turbines are then limited. In particular, preventing air from the primary vein from re-entering the sub-vein cavity makes this cavity cooler than the vein, and the turbine rotors can therefore resist higher centrifugal forces and be dimensioned on lower limit stresses.

As is known, one or more conduits 32 for cooling air circulation each draw a fraction of cooling air of airflow circulating in the high-pressure compressor 30, and convey the fraction of drawn air in the region of at least one stage of the high-pressure turbine 50 and of the low-pressure turbine 60.

A cooling malfunction of the turbines 50, 60 can have several causes. One cause of the cooling malfunction can be malfunction of a conduit 32, for example accidental breakage or blocking of one of the conduits 32 for air circulation. Another cause of this malfunction can result from excessive wear or breakage of one or more sealing joints, or dynamic seal of the high-pressure turbine 50 or of the low-pressure turbine 60. By way of example a cooling malfunction of the turbine 50, 60 results from a defect in a labyrinth seal 69 ensuring pressure insulation of the sub-vein cavity 58, 68 of the high-pressure or low-pressure turbine 50, 60.

The injection device 80 comprises a plurality of first injectors 81, and a plurality of second injectors 82, the first and second injectors 81, 82 being distributed over a wall of the distributor 70 around the axis X. For a simpler description of this embodiment a single first injector 81 and a single second injector 82 are shown in FIG. 2 in each sub-vein cavity 58, 68. Also, throughout the description the embodiment is described in reference to the low-pressure turbine 60, for the sake of conciseness. Yet, the characteristics described hereinbelow apply also to the high-pressure turbine 50.

The first injector 81 is an orifice made in the wall of the distributor 70 for injecting permanently, that is, continuously when the turbomachine is in operation, a first cooling air flow into the sub-vein cavity 68. This first debit ensures cooling, more precisely the purge 76 and the temperature maintenance of the low-pressure turbine 60 in nominal operation conditions of the latter, that is, in the absence of one of the malfunctions mentioned hereinabove. The dimensions of the orifice are determined so that the first flow is between 270 and 310 g/s for example.

The second injector 82 (ventilation device) comprises a tube 84 a first end of which is fixed to the distributor 70, and a second end comprising an air outlet blocked by a flap 86, acting as blocking means during nominal operation of the turbine 60. The flap 86 is fixed to the second end of the tube 84 by means of a hinge 861. Other means of fastening the flap 86 to the tube 84 are possible, such as for example a stop chain, once the flap 86 stays attached mechanically to the tube 84 even if the temperature within the sub-vein cavity 68 is greater than the melting temperature defined hereinbelow.

In nominal operation of the turbine 60, the flap 86 is kept in blocking position, preventing the air present in the tube 84 from entering the sub-vein cavity 68. This holding in blocking position is achieved by means of locking means 87. The locking means 87 are a mechanical part fixed and inserted in between the internal wall of the tube 84 and the wall of the flap 86 on the cavity side. This mechanical part acts as a wedge preventing the flap from opening, that is, moving to opening position, by resisting forces exerted by air on the inner wall side of the tube 84 of the flap 86.

The locking means 87 can be produced by deposit of eutectic material comprising for example 88% aluminium and 12% silicon, and having a melting temperature of 577° C. This melting temperature, and consequently the material selected for the locking means 87, is determined so that in nominal operation conditions the temperature within the sub-vein cavity 68 remains under this melting temperature of the locking means 87. In this way, in nominal operation conditions the flap 86 completely blocks the second end of the tube 84, so that the cooling air cannot be injected into the sub-vein cavity by way of the second injector 82. The locking means 87 are configured to resist differences in pressure in nominal operation conditions when the flap 86 is blocking the end of the tube 84, between the air present in the tube 84 and the sub-vein cavity 68. The locking means 87 are configured for example to resist a pressure differential between the air present in the tube 84 and the sub-vein cavity 68 of the order of 3 bars.

When malfunctions as mentioned hereinabove occur, the temperature within the sub-vein cavity 68 rises and reaches values greater than temperatures representative of nominal operation. When the temperature within the sub-vein cavity 68 reaches the melting temperature of the locking means 87, the latter melts, thus releasing the flap 86, the latter being able to pivot around the hinge 861 under the effect of pressure exerted by air in the tube 84. An additional cooling air flow, for example between 80 and 90 g/s, can thus be injected into the sub-vein cavity 68 by means of the second injector in addition to the first flow injected by the first injector. The sum of the first and second flows is greater than the ranges of flows representative of nominal operation, and covers instances of malfunctions, characterised by a rise in temperature in the turbine. In this way, it is possible to emphasise the cooling of discs 63, before these elements become damaged by an excessive rise in temperature. In particular, injection of the additional cooling air flow boosts the purge rate 76, also preventing hot air from the vein entering the sub-vein cavity 68.

A second embodiment of the present disclosure will be presented in reference to FIG. 5.

In the present embodiment, the turbomachine module is a turbomachine nacelle 110. The nacelle 110 has an annular form and defines an annular flow vein of a secondary flow. The nacelle 110 comprises an internal face 110a defining said annular vein, and an external face 110b in contact with the ambient air. Between the internal face and the external face the nacelle comprises an internal compartment 116 housing equipment such as electronic accessory cases, pumps and oil and fuel tanks, and others (not shown).

A ventilation device comprises air admission means 112 on the external face 110b, and an air outlet on the internal wall 110a. As an alternative, the air admission means 112 can be arranged on the internal wall 110a, and the air outlet can be arranged on the external face 110b. The air admission means 112 can be a bailer for example, via which cooling air can enter the internal compartment 116. The air outlet can comprise an air outlet grille 114, via which the cooling air circulating in the internal compartment 116 can be evacuated. The circulation of a cooling air flow by means of the ventilation device (arrows in FIG. 5 to the left) ensures the thermal resistance of equipment present in this compartment.

Malfunction of equipment present in the internal compartment 116 can cause a fire inside the latter. The effect of airflow circulating in the compartment is to fuel this fire.

Blocking means 120 block the air outlet grille 114 in the event of fire. The blocking means 120 comprise a lid 122, or detachable door, and a spring 121. The spring 121 is fixed to the lid 122 on one side and to a wall of the air outlet fixed to the nacelle 110 and immobile relative to the latter. The spring 121 is configured to work under compression so as to push the lid 122 towards the air outlet grille 114.

In nominal operation, that is, in the absence of an anomaly causing a fire, the lid 122 must be kept in opening position so as to let the cooling air present in the internal compartment 116 be evacuated via the air outlet grille 114, accordingly maintaining a cooling air flow in the internal compartment 116 necessary for the thermal resistance of the equipment. To this end, locking means 130 are inserted in between the internal wall 110a of the nacelle 110 and the lid 122, acting as a wedge to retain an adequate flow cross-section for ejection of air via the air outlet grille 114.

The locking means 130 can be a fusible rod constituting eutectic material comprising for example 45% silver, 38% gold and 17% germanium, and having a melting temperature of 525° C. This melting temperature, and consequently the material selected for the locking means 130, is determined so that, in nominal operation conditions, the temperature within the internal compartment 116 stays under this melting temperature of the locking means 130. In this way, in nominal operation conditions, the lid 122 remains in opening position, so that the cooling air can circulate in the internal compartment 116. The fusible rod 130 is configured to be sufficiently thick so as to resist the force exerted by the spring 121, and sufficiently fine to leave an adequate flow cross-section to have limited or no impact on the cooling air flow.

When a malfunction as mentioned hereinabove does occur, the temperature within the internal compartment 116, in particular the temperature of the cooling air circulating in the internal compartment 116, rises due to the fire and reaches values greater than temperatures representative of nominal operation. When this temperature reaches the melting temperature of the locking means 130, the latter melts, consequently releasing the lid 122, the latter able to move to the blocking position under the effect of pressure exerted by the spring 121 (FIG. 5, at right). In this blocking position of the air outlet grille 114, the cooling air can no longer circulate in the internal compartment 116, such that the fire present in the latter is snuffed out.

Even though the present invention has been described in reference to specific exemplary embodiments, it is evident that modifications and changes can be made to these examples without departing from the general scope of the invention such as defined by the claims. In particular, individual characteristics of the different embodiments illustrated/mentioned can be combined in additional embodiments. Consequently, the description and the drawings must be considered in an illustrative rather than a restrictive sense.

It is also evident that all the characteristics described in reference to a process are transposable, singly or in combination, to a device, and inversely all the characteristics described in reference to a device are transposable, singly or in combination, to a process.

The invention claimed is:

1. An aircraft turbomachine turbine comprising a ventilation device configured to have a cooling air flow circulate in the turbine, the turbine comprising a annular vein of hot airflow, a sub-vein cavity coaxial to the hot airflow vein, the ventilation device comprising:
   an injection device configured to inject cooling air into the sub-vein cavity,
   at least one tube extending into the sub-vein cavity, a first end of the tube being fixed to a wall of the sub-vein cavity, a second end of the tube being an air outlet,
   blocking means fixed to the second end and mobile between a blocking position of the air outlet and an opening position of the air outlet, and
   locking means configured to maintain the blocking means in the blocking position when the temperature within the sub-vein cavity is less than a predetermined threshold value, the locking means comprising a fusible material configured to melt so as to let the blocking means adopt the opening position when the temperature within the module is greater than said predetermined threshold value
wherein the blocking means are a flap mobile between the blocking position and opening position by means of a hinge fixed to the second end of the tube.

2. The turbine according to claim 1, wherein, when the temperature within the turbine is less than the predetermined threshold value, the locking means present a volume of between 5 and 20 mm$^3$.

3. The turbine according to claim 1, wherein the locking means are a deposit of eutectic material in an angle between the flap in blocking position and the wall of the tube.

4. The turbomachine comprising the turbine according to claim 1.

* * * * *